US008856068B2

(12) United States Patent
McConaughy et al.

(10) Patent No.: US 8,856,068 B2
(45) Date of Patent: Oct. 7, 2014

(54) REPLICATING MODIFICATIONS OF A DIRECTORY

(75) Inventors: John Mark McConaughy, Austin, TX (US); John Ryan McGarvey, Apex, NC (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 2792 days.

(21) Appl. No.: 11/104,046

(22) Filed: Apr. 12, 2005

(65) Prior Publication Data

US 2006/0230078 A1    Oct. 12, 2006

(51) Int. Cl.
*G06F 7/00* (2006.01)
*G06F 17/30* (2006.01)
*H04L 29/08* (2006.01)

(52) U.S. Cl.
CPC ................................. *H04L 67/1095* (2013.01)
USPC ............................ 707/613; 707/637; 707/638

(58) Field of Classification Search
USPC .................................. 707/610, 613, 658, 633
See application file for complete search history.

(56) References Cited

U.S. PATENT DOCUMENTS

| | | | | |
|---|---|---|---|---|
| 5,799,141 A * | 8/1998 | Galipeau et al. | ................ | 714/13 |
| 5,956,489 A * | 9/1999 | San Andres et al. | .......... | 709/221 |
| 6,446,077 B2 * | 9/2002 | Straube et al. | ........................ | 1/1 |
| 6,615,223 B1 * | 9/2003 | Shih et al. | ..................... | 707/201 |
| 6,751,634 B1 * | 6/2004 | Judd | .............................. | 707/200 |
| 6,782,399 B2 | 8/2004 | Mosher, Jr. | | |
| 2003/0177194 A1 | 9/2003 | Crocker et al. | | |
| 2003/0195903 A1 | 10/2003 | Manley et al. | | |
| 2004/0139083 A1 * | 7/2004 | Hahn et al. | .................... | 707/100 |
| 2004/0172421 A1 | 9/2004 | Saito et al. | | |
| 2004/0187127 A1 * | 9/2004 | Gondi et al. | .................. | 718/100 |
| 2004/0267752 A1 * | 12/2004 | Wong et al. | ....................... | 707/9 |

FOREIGN PATENT DOCUMENTS

| | | |
|---|---|---|
| EP | 1 244 015 A2 | 9/2002 |
| JP | 2004000072 A | 1/2004 |

OTHER PUBLICATIONS

Goldring; Things Every Update Replication Customer Should Know; INSPEC AN C9509-61boB-005; Jun. 1995; pp. 439-440; vol. 24, No. 2; US.

* cited by examiner

*Primary Examiner* — Robert Beausoliel, Jr.
*Assistant Examiner* — Hexing Liu
(74) *Attorney, Agent, or Firm* — Jeffrey S. LaBaw

(57) ABSTRACT

Replicating modifications of a directory that include receiving in a source directory service for a source directory requests for modifications in the source directory and transmitting, from the source directory service to a duplicate directory service for a duplicate directory asynchronously in parallel over a plurality of data communications connections, requests for the same modifications in the duplicate directory. In typical embodiments, a duplicate directory may replicate a subtree of a source directory, receiving requests for modifications may include receiving in the source directory service requests for modifications in the subtree in the source directory, and transmitting requests may include transmitting requests for the same modifications in the subtree in the duplicate directory.

7 Claims, 6 Drawing Sheets

REPLICATING MODIFICATIONS OF A DIRECTORY

BACKGROUND OF THE INVENTION

1. Field of the Invention

The field of the invention is data processing, or, more specifically, methods, systems, and products for replicating modifications of a directory.

2. Description of Related Art

A directory service, such as an LDAP service or an X.500 service, is a computer-implemented data storage and retrieval methodology. 'LDAP' refers to the Lightweight Directory Access Protocol, a set of protocols for accessing information directories. X.500 is an ISO and ITU standard for directory structure. X.500 directories are hierarchical, that is, tree structures, with different levels for each category of information, such as country, state, and city. LDAP is based on the X.500 standard, but is significantly simpler. And unlike X.500, LDAP supports TCP/IP, an important feature for internet-oriented directory access.

A directory service is a system that operates according to a directory protocol. LDAP is a protocol, or actually a set of protocols. The X.500 standards include a directory access protocol. The general model of a directory protocol is one of clients performing protocol operations against servers. In this model, a client transmits a protocol request describing to a server an operation to be performed on a directory, a modification, a comparison, a security binding, and so on. The server is then responsible for performing the requested operation in the directory. Upon completion of the operation, the server returns a response containing any result or error to the requesting client. In addition, directory protocols typically also permits servers to return to clients referrals to other servers. As an aid to overall system performance, this allows servers to offload back to clients the work of contacting other servers to progress operations.

A directory service implements persistence for its data in its directory tree by use of backup databases optimized for fast reads. Such backup databases may be relational databases or BTREEs, for example. A hierarchy, or tree, of data in a directory is represented in attribute type—attribute value pairs. This structure offers flexibility in designing directory entries. A particular user record, for example, can have new types of data added without having to re-design the entire database. Any kind of text or binary data can be stored. A directory service is particularly useful for relatively static information, such as company directories, user data, customer data, passwords, and security keys.

For high availability and scalability directory data is replicated among two or more directory servers. Directories may contain huge quantities of data, with many updates to directory entries occurring each second. Replicas may be separated by network links with significant latency. High volume access to a large directory can be slow. An early approach to directory replication called 'Stand Alone LDAP Update. Replication Daemon' or 'SLURPD' was developed at University of Michigan, but SLURPD replication is very slow over slow network links. Another approach to directory replication named 'Bulk Update/Replication Protocol' or 'LBURP' was published in an individual submission to an Internet Working Group in a document named draft-rharrison-iburp-03.txt by R. Harrison, J. Sermersheim, and Y. Dong in March 2001. LBURP groups directory operations in bunches, so that more can be sent at one time, instead of replicating a single operations and waiting for the response. LBURP, however, makes no use of parallelism in processing, and LBURP also introduces additional network traffic overhead in that each directory operation must have additional encapsulation.

SUMMARY OF THE INVENTION

Methods, systems, and computer program products are disclosed that operate generally to provide directory duplication with parallel communications of requests for modifications with no need for additional encapsulation of request messages. More particularly, exemplary methods, systems, and products are described for replicating modifications of a directory that include receiving in a source directory service for a source directory requests for modifications in the source directory and transmitting, from the source directory service to a duplicate directory service for a duplicate directory asynchronously in parallel over a plurality of data communications connections, requests for the same modifications in the duplicate directory. In typical embodiments, a duplicate directory may replicate a subtree of a source directory, receiving requests for modifications may include receiving in the source directory service requests for modifications in the subtree in the source directory, and transmitting requests may include transmitting requests for the same modifications in the subtree in the duplicate directory.

Some embodiments may include identifying requests for related serial operations. In such embodiments, transmitting requests may include transmitting identified requests for related serial operations on the same data communication connection. In such embodiments, requests for related serial operations may include a request to modify a schema of an entry and a subsequent request to modify the entry. Requests for related serial operations may include a request to create or move an entry having a child and a subsequent request to modify the child. Requests for related serial operations may include a request to delete or move a child of an entry and a subsequent request to modify the entry. And requests for related serial operations may include a request to modify an entry and a subsequent request to modify the entry.

Embodiments may also include bracketing, by a source directory service, a plurality of requests as an atomic transaction. In such embodiments, transmitting requests may include transmitting bracketed requests of an atomic transaction on the same data communications connection.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
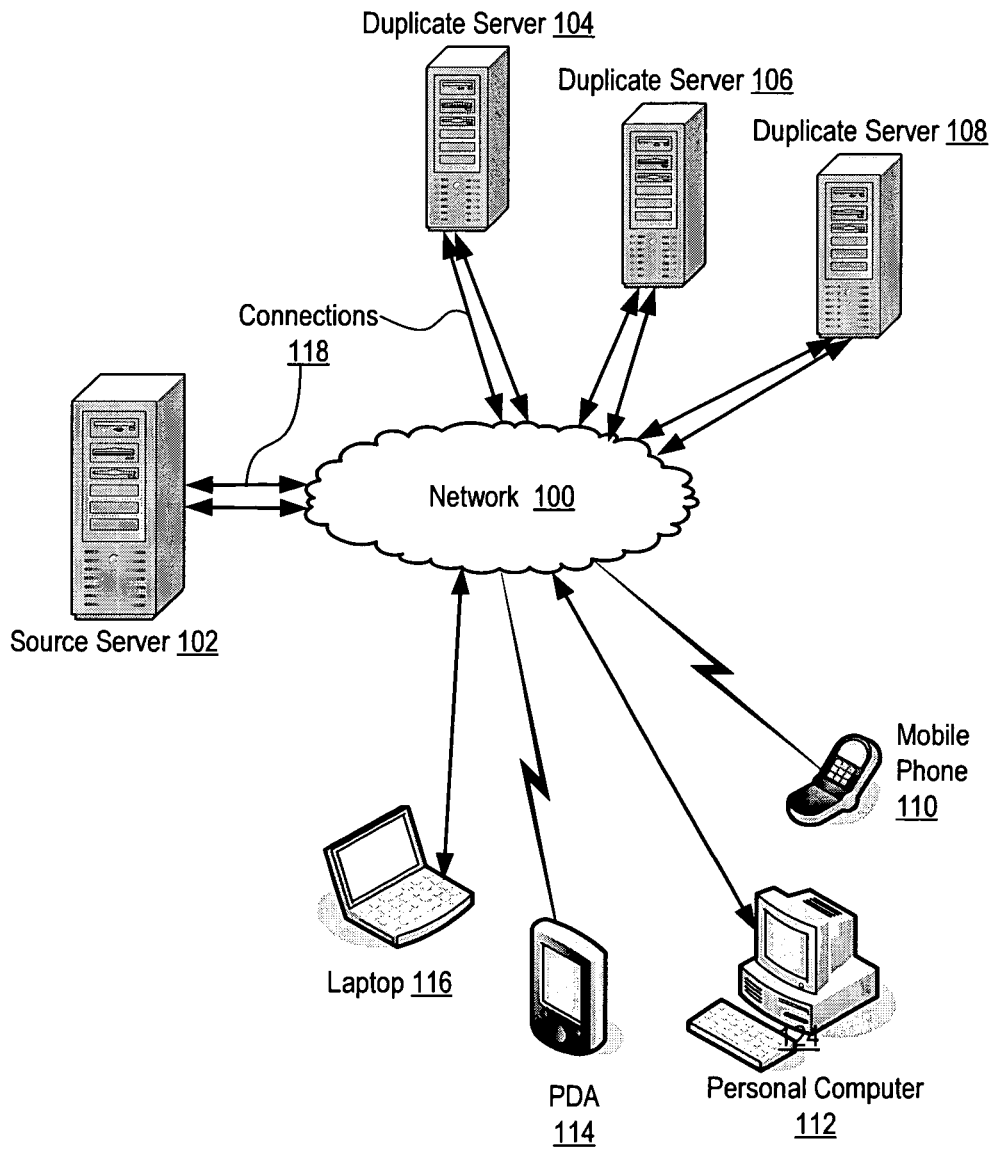
FIG. 1 sets forth a network diagram illustrating an exemplary system for replicating modifications of a directory according to embodiments of the present invention.

Exemplary methods, systems, and products for replicating modifications of a directory according to embodiments of the present invention are described with reference to the accompanying drawings, beginning with FIG. 1. FIG. 1 sets forth a network diagram illustrating an exemplary system for replicating modifications of a directory according to embodiments of the present invention. The system of FIG. 1 operates generally to replicate modifications of a directory according to embodiments of the present invention by receiving in a source directory service for a source directory requests for modifications in the source directory and transmitting, from the source directory service to a duplicate directory service for a duplicate directory asynchronously in parallel over a plurality of data communications connections, requests for the same modifications in the duplicate directory. The system of FIG. 1 includes a source server (102), a computer upon which may be installed a source directory service for a source directory. A 'source directory service' is a directory service that has all or part of its directory tree duplicated through other directory services. The other directory services are referred to in this specification as 'duplicate directory services.' The directory tree administered by a source directory service is referred to as a 'source directory tree.' The directory tree administered by a duplicate directory service is referred to as a 'duplicate directory tree.' The system of FIG. 1 includes several duplicate servers (104, 106, 108), computers upon which may be installed duplicate directory services for duplicate directories.

A source directory service according to embodiments of the present invention functions generally as a 'source' of modifications to directory trees, both its own directory tree and one or more directory trees (or subtrees) in one or more duplicate directory trees. Modifications include changing data values in entries in a directory, deleting entries from a directory, adding new entries to a directory, and moving data within a directory, that is, changing an entry's position in the directory tree. Not all requests for access to directory data modify directory data. Requests that do not modify directory data include binding requests for exchange of security data, search requests, comparison requests, and some user-defined extended requests.

The example system of FIG. 1 includes several client devices coupled for data communications through network (100) to source server (102) and to duplicate servers (104, 106, 108). The client devices include laptop (116), personal digital assistant ('PDA') (114), personal computer (112), and mobile phone (110). The client devices include directory client software that issues directory request messages in a directory protocol such as, for example, LDAP. The request messages represent requests to modify directory entries, bind security data, search a directory tree, and so on. For efficient use of the server resources, duplicate servers (104, 106, 108), may answer search and comparison requests only, accepting modification requests only from source server (102), and returning referrals to source server (102) for modification requests from client devices. Similarly, source server (102) may be configured to execute only modification requests, referring search and comparison requests to duplicate servers (104, 106, 108). In this way, particularly for scalability and efficiency, all modifications are channeled through a single server that may, for example, implement a complete master directory when a duplicate server implements only a subset or subtree.

In fact, it is useful to note that no duplicate server is required to duplicate an entire directory as implemented on a source server. It is common in replicating modifications of a directory according to embodiments of the present invention for a duplicate server to duplicate only a subtree of a master directory on a source server. Consider an example using a system similar to the one illustrated in FIG. 1 that implements a directory tree in a source server for user account information for user of a multi-national organization with offices in Europe, China, and the United States. This example may place the entire directory including all modification processing on a source server (102) physically located, for example, in Chicago, and:

place in Beijing on duplicate server (104) a subtree storing user account information for users located in China, place in New York on duplicate server (106) a subtree storing user account information for users located in the United States, and place in Frankfurt on duplicate server (108) a subtree storing user account information for users located in Europe.

In this example, clients may address modification requests to duplicate servers, and the duplicate servers may refer such requests back to the source server. The source server (102) makes all modifications initially in its master directory tree, and then:

transmits modifications for the China subtree to duplicate server (104) in Beijing, transmits modifications for the United States subtree to duplicate server (106) in New York, and transmits modifications for the Europe subtree to duplicate server (108) in Frankfurt.

A source directory service in source server (102) is improved according to embodiments of the present invention to transmit to the duplicate servers requests for the same modifications made in the source directory. The transmissions are made in parallel over a plurality of data communications connections (118). FIG. 1 shows only two data communications connections between source server (102) and the duplicate servers, but, within the scope of the present invention, the source server may use any number of data communications connections for such parallel transmissions.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Replicating modifications of a directory in accordance with the present invention is generally implemented with computers, that is, with automated computing machinery. In the system of FIG. 1, for example, the network, the servers, and the client devices are implemented to some extent at least as computers. For further explanation, therefore, FIG. 2 sets forth a block diagram of automated computing machinery comprising an exemplary computer (152) useful in replicating modifications of a directory according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Stored in RAM (168) is a source directory service that includes computer program instructions for replicating modifications of a directory according to embodiments of the present invention. The source directory service replicates modifications to source directory tree (428), also stored in RAM (168). Also stored RAM (168) is a source receive queue (434), a master thread (468), several transmission queues (416, 418, 420), and several transmission threads (417, 419, 421). Each transmission threads operates data communications on a data communications connection between a source directory service and a duplicate directory service on behalf of one transmission queue. The source directory service places client requests in the source receive queue, serially, in the order in which they arrive. The master thread (468) operates generally to remove requests from the source receive queue (434) and place them in transmission queues so that they are transmitted in parallel over a plurality of data communications connections (460).

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. Operating system (154) and source directory service (438) in the example of FIG. 2 are shown in RAM (168), but many components of such software typically are stored in non-volatile memory (166) also.

Figure 2:
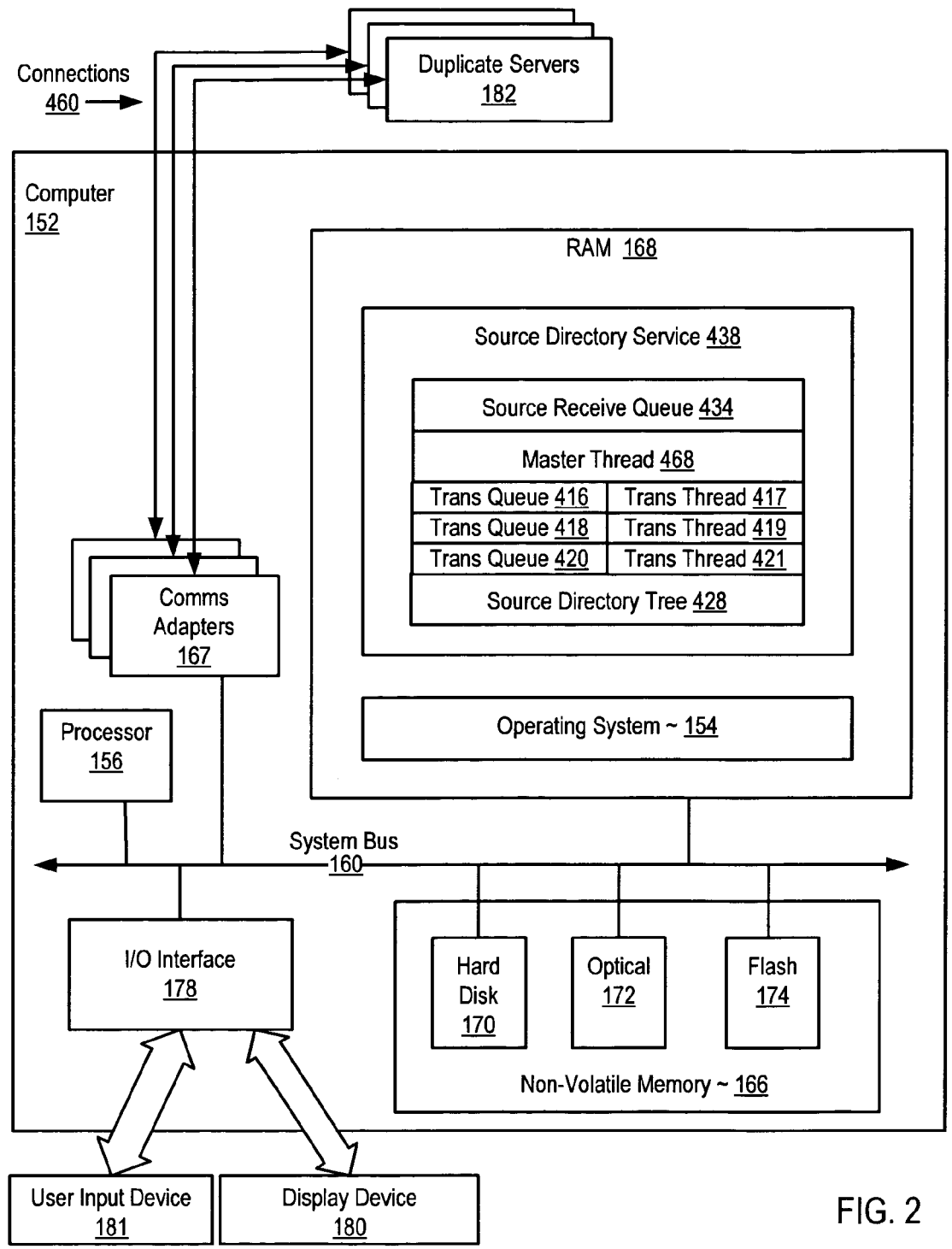
FIG. 2 sets forth a block diagram of automated computing machinery comprising an exemplary computer useful in replicating modifications of a directory according to embodiments of the present invention FIG. 3 sets forth a block diagram of an exemplary system for replicating modification of a directory according to embodiments of the present invention.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes communications adapters (167) for implementing data communications connections (460) with other computers (182), particularly duplicate servers. Such data communications may be carried out through RS-232 connections, through external buses such as USB, through data communications networks such as IP networks, and in other ways as will occur to those of skill in the art. Communications adapters implement the hardware level of data communications through which at least one transmission thread (417, 419, 421) sends data communications to a duplicate server, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications. Each data communications adapter may operate serially, but in combination they support parallel transmissions to duplicate servers of requests for the same modifications made in a source directory tree.

Figure 3:
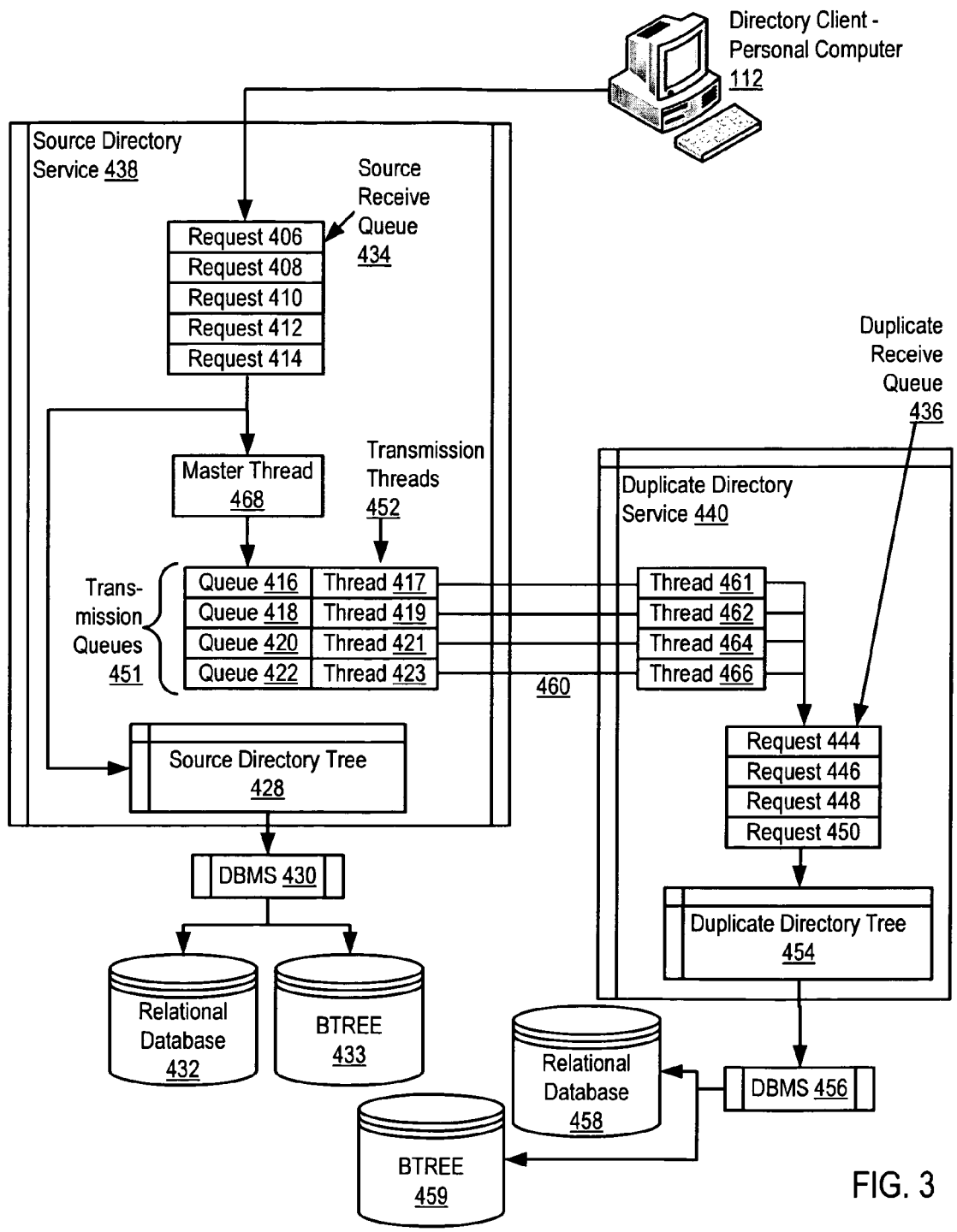

For further explanation, FIG. 3 sets forth a block diagram of an exemplary system for replicating modification of a directory according to embodiments of the present invention. The system of FIG. 3 includes a source directory service (438) and a duplicate directory service (440). The source directory service receives from a directory client, in this example personal computer (112), requests for modifications to a source directory tree (428). The requests are stored serially in a source receive queue (434). The system of FIG. 3 includes several transmission queues (451) and several transmission threads (452), one transmission thread for each transmission queue. Each transmission thread is a data communications program that retrieves requests from its corresponding queue, in the order in which the requests were enqueued, and transmits the requests to the duplicate directory service. The source directory service (438) of FIG. 3 also includes a master thread (468), a computer program that removes requests from the source receive queue (434) and places them in transmission queues so that they are transmitted by multiple transmission threads (452) in parallel over a plurality of data communications connections (460). For speedy access, source directory tree (428) to the extent feasible is kept in RAM, with persistence provided by a database management system ('DBMS') (430) which in turn operates a relation database (432), a BTREE-type database (433), or some other persistent data storage as will occur to those of skill in the art.

As mentioned above, a directory protocol for data communications in FIG. 3 is a client-server, request-response protocol. It is useful to note, however, that whether a particular device is a client or a server is a matter of role rather than a fixed designation. When source directory service (438) receives modification requests from client (112) and updates its source directory tree, source directory service (438) is acting as a directory server. When source directory service (438) uses transmission threads to transmit those same modification requests to duplicate directory service (440), source directory service (438) is acting as a directory client.

The system of FIG. 3 includes a duplicate directory service (440) which replicates or duplicates in a duplicate directory tree (454) at least one subtree of the source directory (428). Duplicate directory service (440) views each data communications connection as a source of client requests for modification of entries in the duplicate directory tree (454). Duplicate directory service (440) operates generally by enqueuing in its duplicate receive queue (436) each request received on the parallel data communications connections (460) in the order in which it is received. In this example, duplicate receive service (440) does not provide a separate receive for each receive thread (461, 462, 464, 466), providing instead a single duplicate receive queue (436) into which are placed all received requests in the order in which they are received. For speedy access, duplicate directory tree (428) to the extent feasible is kept in RAM, with persistence provided by a database management system ('DBMS') (456) which in turn operates a relation database (458), a BTREE-type database (459), or some other persistent data storage as will occur to those of skill in the art.

Figure 4:
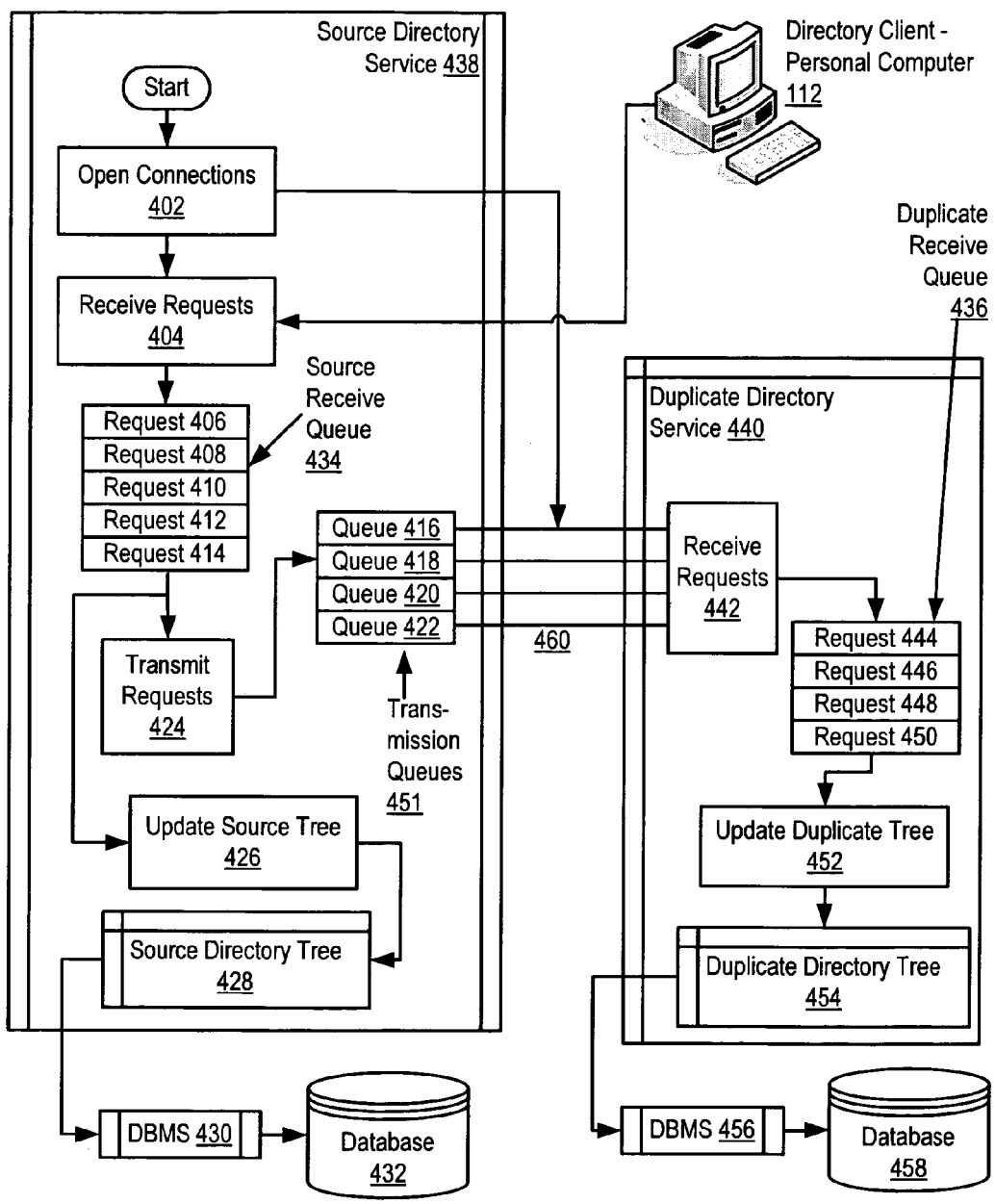
FIG. 4 sets forth a flow chart illustrating an exemplary method for replicating modifications of a directory according to embodiments of the present invention.

For further explanation, FIG. 4 sets forth a flow chart illustrating an exemplary method for replicating modifications of a directory according to embodiments of the present invention that includes opening (402) two or more of data communications connections (460) between a source directory service (438) and a duplicate directory service (440). The method of FIG. 4 includes receiving (404) in a source directory service (438) for a source directory requests (406-414) for modifications in the source directory. The source directory is implemented as a source directory tree (428), persistence for which is provided by a DBMS (430) and a backup database (432).

The method of FIG. 4 includes transmitting (424), from the source directory service to a duplicate directory service (440) for a duplicate directory (454), requests (444-450) for the same modifications in the duplicate directory. The source directory service (438) transmits the requests asynchronously in parallel over a plurality of data communications connections (460). The transmit function (424), which may be implemented with a master thread as described above, removes requests from the source receive queue (434) in the order in which they were received and adds each request to the shortest available transmission queue (451). The queues may be implemented as linked lists in the C programming language, queue classes in C++ or Java, a linked list in assembler, or any other queue structure in any programming language as may occur to those of skill in the art.

As mentioned above, in the method of FIG. 4 the duplicate directory (454) may duplicate a subtree of the source directory (428), so that the transmit function may select, from among several duplicate servers, a particular duplicate server to which to transmit a particular request. Receiving (404) requests for modifications may include receiving in the source directory service (438) requests for modifications in a particular subtree in the source directory (428), and transmitting requests (424) may be carried out by transmitting requests for the same modifications in the same subtree in the duplicate directory (454).

The method of FIG. 4 also includes updating (426) a source directory (428) according to requests (406-414) received from directory clients. In this example, source directory tree (428) is a master directory, subtrees of which are duplicated in one or more duplicate directories (454). Requests (406-414) to modify the directory received from directory clients, therefore, advantageously are executed not only in the duplicates, but also in the source directory (428).

Figure 5:
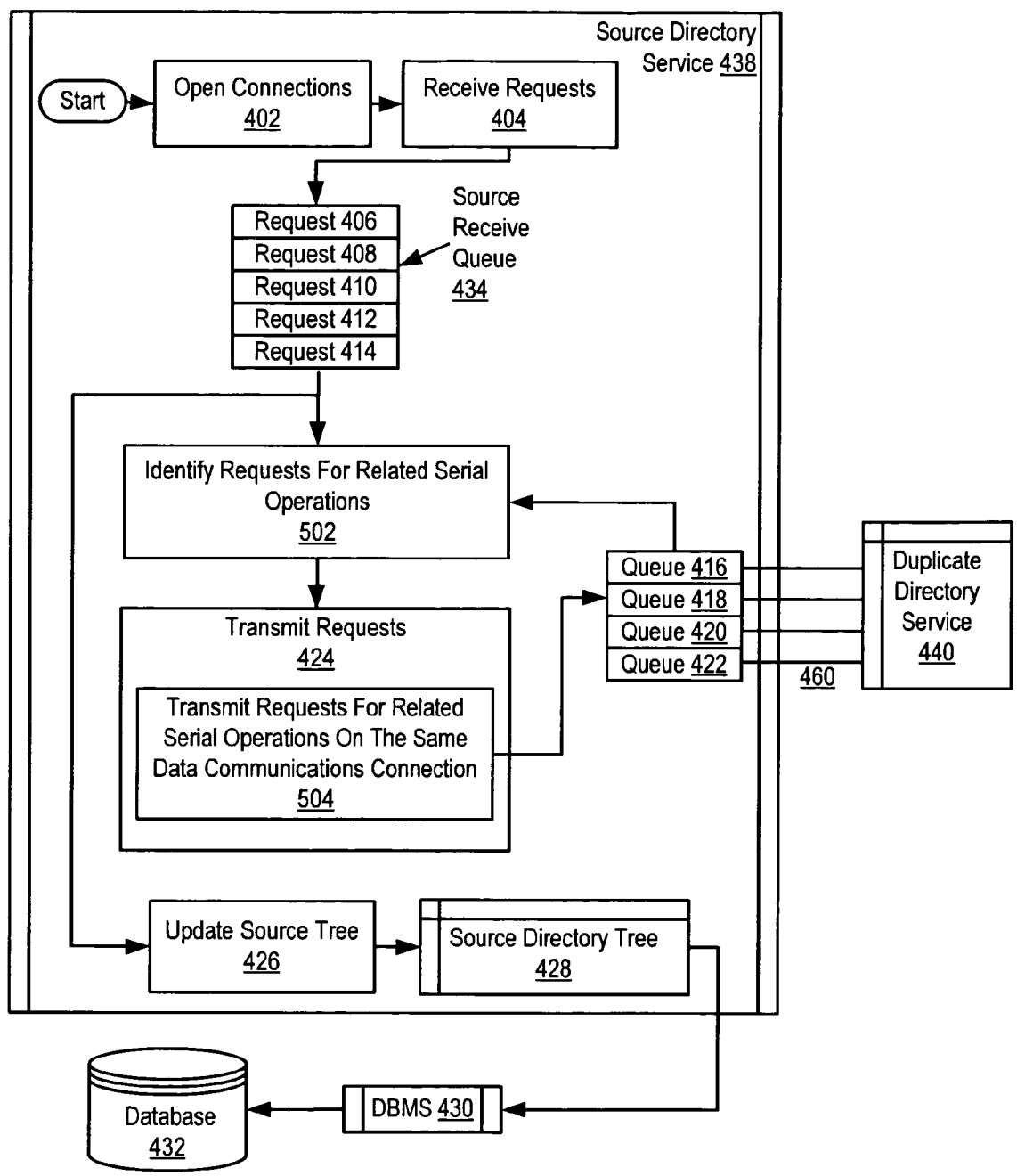
FIG. 5 sets forth a flow chart illustrating a further exemplary method for replicating modifications of a directory according to embodiments of the present invention.

For further explanation, FIG. 5 sets forth a flow chart illustrating a further exemplary method for replicating modifications of a directory according to embodiments of the present invention similar to the method of FIG. 4. That is, the method of FIG. 5 includes receiving requests for modifications (404), transmitting (424) the requests to a duplicate directory service, and updating (426) a source directory (428) according to the requests (406-414), all as described above for the method of FIG. 4. The method of FIG. 5, however, also includes identifying (502) requests for related serial operations, and, in the method of FIG. 5, transmitting (424) requests includes transmitting (504) identified requests for related serial operations on the same data communication connection.

Requests for related serial operations are requests for directory operations that are usefully executed in the order in which their requests are initially received. Transmitting such requests on separate data communications connections carries a risk that the requests may be executed out of order in the duplicate directory service. A request (414) that arrived in the source directory service (438) before a second request (412), when transmitted over a different, slower data communications connection, may arrive at the duplicate directory service (440) after the second request.

One example of requests for related serial operations is a request to modify a schema of an entry and a subsequent request to modify the entry. Schema is the collection of attribute type definitions, object class definitions and other information which a directory service uses to determine how to match a filter or attribute value assertion (in a compare operation) against the attributes of an entry, and whether to permit add and modify operations. It is useful, for example, for a schema change permitting modification of an entry to be executed before attempting to modify the entry.

A further example of requests for related serial operations is a request to create or move an entry having a child and a subsequent request to modify the child. It is useful that the child entry exist before attempting to modify it. Moving an entry means changing its distinguished name and therefore its location in its directory tree. A subsequent request to modify the entry will attempt to access the entry at its new location. It is useful therefore to move the entry to its new location before attempting to access it at the new location.

A still further example of requests for related serial operations is a request to delete or move a child of an entry and a subsequent request to modify the entry. A modification of an entry may modify one or more of the entry's children. A subsequent request to modify an entry relies on the previous deletion or move of a child to mean that the child is no longer among the children to be modified. If the child is still there, it risks an undesired modification.

An even further example of requests for related serial operations is a request to modify an entry and a subsequent request to modify the entry. Many modifications to a single entry are usefully executed in a particular order. Consider, for example, a move followed by a deletion. The deletion is directed to the new location to which it believes the entry was previously moved. The attempt to delete fails and leaves the duplicate tree with an entry that no longer exists in the source directory tree.

In the example of FIG. 5, transmitting (504) identified requests for related serial operations on the same data communication connection may be carried out by a master thread that adds related serial operations to the same transmission queue in the same sequence in which the requests were received in the source directory service. Queues have a maximum size. Placing all requests for related serial operations on the same transmission queue assures that they will arrive in a duplicate directory service in the same order in which they were received in the source directory service. If a queue fills before all requests for a set of identified related serial operations can be placed in the queue, the master thread waits until there is space available in that particular transmission queue. For requests not serially related, the master thread adds the requests to the shortest available queue, as described above.

Figure 6:
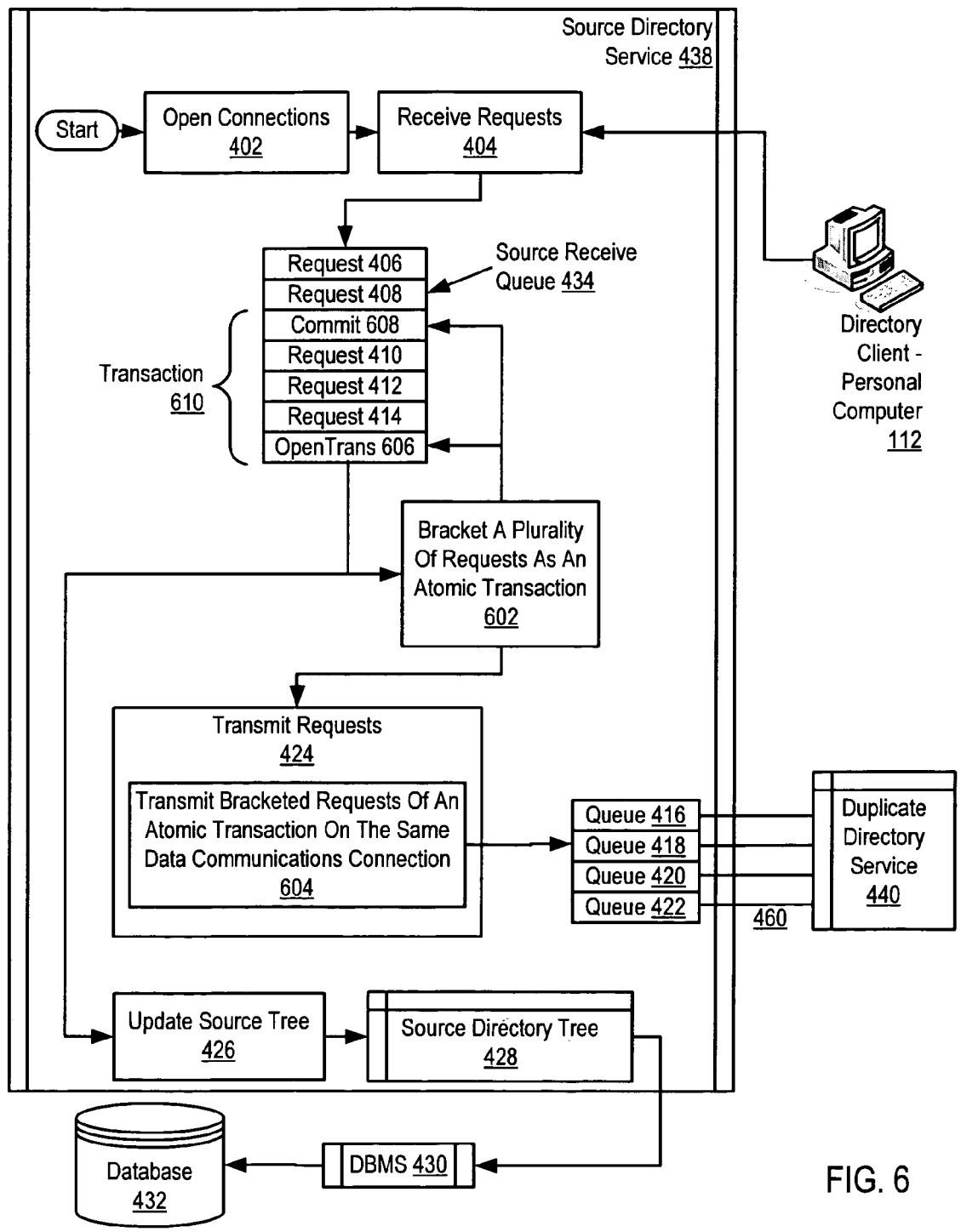
FIG. 6 sets forth a flow chart illustrating a still further exemplary method for replicating modifications of a directory according to embodiments of the present invention.

For further explanation, FIG. 6 sets forth a flow chart illustrating a still further exemplary method for replicating modifications of a directory according to embodiments of the present invention similar to the method of FIG. 4. That is, the method of FIG. 6 includes receiving requests for modifications (404), transmitting (424) the requests to a duplicate directory service, and updating (426) a source directory according to the requests, all as described above for the method of FIG. 4. The method of FIG. 6, however, also includes bracketing (602), by the source directory service (438), a plurality of requests as an atomic transaction, and, in the method of FIG. 6, transmitting requests (424) includes transmitting (604) bracketed requests of an atomic transaction on the same data communications connection.

A transaction is a set of requests for modification operations on a directory tree to be executed atomically. The requests and operations are executed 'all-or-none.' A transaction succeeds if all its operations execute successfully. If any operation in the set fails, for any reason, the entire set is rolled back to the beginning as if none of it ever occurred.

There are many uses for transactions at the application level, and many DBMSs support transaction processing. Consider bookkeeping, for example, with debits and credits. Each journal entry contains a balanced set of debits and credits. If a single debit or credit entry fails without transaction processing, the result is a journal or ledger that is out of balance. Data processing systems for accounting and bookkeeping therefore typically bracket bookkeeping entries in atomic transaction. If any entry in a transaction fails, the entire transaction is rolled back, leaving the books in balance.

A request in a directory protocol may effect an operation that affects more than one directory entry. Such operations typically are executed atomically, but directory protocols typically do not provide atomicity across requests or operations. Atomicity across requests or operations, however, may be added to directory protocols through user extensions. LDAP, for example, is an extensible protocol. User extensions are provided for in the LDAP standard. Transaction are typically 'bracketed,' that is scoped, opened and closed, by client software at the application program. They are supported by DBMSs and user-extended directory protocols, but it is the accounting system, for example, that knows which debits and credits go in which transactions.

In the example of FIG. 6, a bracket function (602) brackets requests (410, 412, 414) as a transaction by inserting an 'open transaction' request (606) ahead of the bracketed requests in receive queue (434) and a 'commit transaction' request (608) behind the bracketed requests in the receive queue. As mentioned above, open transaction requests and commit transaction requests are traditionally received from client applications, such as accounting programs, on directory clients such as personal computer (112). Such requests would then appear in the source receive queue and be processed normally by the update function (426) for the source directory tree (428). It is useful therefore for the bracket function (602) in the source directory service (438) to put the open and commit requests (606, 608) in the receive queue (434) because the open and commit requests (606, 608) are then presented both to the duplicate directory service (440) through the transmit function (424) and also to the update function (426) for the source tree (428).

Sharp-eyed readers are now asking why the source directory service is bracketing transactions, when it is the application level that needs transactions and knows how to scope the transactions. The answer is overall processing efficiency. Backup servers that provide persistence to directory trees commit transaction data to persistent storage in groups—thereby minimizing input/output costs and also reducing reindexing overhead for a group of modifications. Systems that replicate modifications of a directory according to embodiments of the present invention therefore may usefully bracket a group of requests as a transaction despite the fact that no client-level application has requested such bracketing.

In the method of FIG. 6, transmitting requests (424) includes transmitting (604) bracketed requests of an atomic transaction on the same data communications connection. Remember that requests transmitted in parallel on separate data communications connections may arrive in the duplicate directory service in a different sequence. If an open transaction request were transmitted on a separate, slower data communications connection, for example, and the rest of the transaction requests were transmitted on a faster connection, it would be possible for the open transaction request to arrive in the duplicate directory service actually later than the commit request for the transaction. Moreover, bracketed requests in an atomic transaction often are advantageously executed in the same sequence in which they were placed in the source receive queue. If bracketed requests within a transaction are transmitted on separate connections, they too may arrive out of order. For these reasons, therefore, systems that replicate modifications of a directory according to embodiments of the present invention therefore may usefully transmit (604) bracketed requests of an atomic transaction on the same data communications connection. This is true regardless whether requests of a transaction are bracketed by the source directory service (438) or by an application on a directory client (112).

Exemplary embodiments of the present invention are described largely in the context of a fully functional computer system for replicating modifications of a directory. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for replicating modifications of a directory, the method comprising:
   receiving, in a source directory service for a source directory, requests for modifications in the source directory; and
   transmitting, from the source directory service to a duplicate directory service for a duplicate directory asynchronously in parallel over a plurality of data communications connections, requests for the same modifications in the duplicate directory, wherein:
   the duplicate directory comprises a subtree of the source directory;
   receiving requests for modifications further comprises receiving in the source directory service requests for modifications in the subtree in the source directory; and
   transmitting requests further comprises transmitting requests for the same modifications in the subtree in the duplicate directory.

2. The method of claim 1 further comprising identifying requests for related serial operations, wherein transmitting requests further comprises transmitting identified requests for related serial operations on the same data communication connection.

3. The method of claim 2 wherein requests for related serial operations further comprise a request to modify a schema of an entry and a subsequent request to modify the entry.

4. The method of claim 2 wherein requests for related serial operations further comprise a request to create or move an entry having a child and a subsequent request to modify the child.

5. The method of claim 2 wherein requests for related serial operations further comprise a request to delete or move a child of an entry and a subsequent request to modify the entry.

6. The method of claim 2 wherein requests for related serial operations further comprise a request to modify an entry and a subsequent request to modify the entry.

7. The method of claim 1 further comprising bracketing, by the source directory service, a plurality of requests as an atomic transaction, wherein transmitting requests further comprises transmitting bracketed requests of an atomic transaction on the same data communications connection.

* * * * *